United States Patent [19]

Singer

[11] Patent Number: 5,468,835
[45] Date of Patent: Nov. 21, 1995

[54] POLYETHERPOLYURETHANE END CAPS FOR OIL FILTERS

[75] Inventor: Stephen M. Singer, Peoria, Ill.

[73] Assignee: Caterpillar Inc., Peoria, Ill.

[21] Appl. No.: 230,287

[22] Filed: Apr. 20, 1994

[51] Int. Cl.[6] .......................... C08G 18/48; C08G 18/32
[52] U.S. Cl. .................... 528/76; 528/77; 528/54; 528/58
[58] Field of Search .................. 528/76, 77, 58, 528/54

[56] References Cited

U.S. PATENT DOCUMENTS

| 3,169,934 | 2/1965 | Bennett et al. | 521/131 |
|---|---|---|---|
| 3,594,352 | 7/1971 | Lloyd et al. | 528/77 |
| 3,993,576 | 11/1976 | Barron | 528/76 |
| 4,036,906 | 7/1977 | Finelli | 528/61 |
| 4,143,004 | 3/1979 | Stromblad et al. | 521/174 |
| 4,146,723 | 3/1979 | Findelsen et al. | 548/307 |
| 4,198,238 | 4/1980 | Scheve | 430/286 |
| 4,202,957 | 5/1980 | Bonk et al. | 528/77 |
| 4,247,678 | 1/1981 | Chung | 528/83 |
| 4,385,133 | 5/1983 | Alberino et al. | 528/76 |
| 4,400,498 | 8/1983 | Konishi et al. | 528/60 |
| 4,487,913 | 12/1984 | Chung | 528/83 |
| 4,522,979 | 6/1985 | Chung et al. | 525/66 |
| 4,543,276 | 9/1985 | Parekh | 427/388.3 |
| 4,607,064 | 8/1986 | Kuhn et al. | 521/174 |
| 4,668,535 | 5/1987 | Liggett et al. | 427/230 |
| 4,713,399 | 12/1987 | Webb et al. | 521/110 |
| 4,728,711 | 3/1988 | Rosthauser et al. | 528/73 |
| 4,745,170 | 5/1988 | Bushman et al. | 528/61 |
| 4,767,825 | 8/1988 | Pazos et al. | 525/408 |
| 4,826,885 | 5/1989 | Tsai | 528/77 |
| 5,001,167 | 3/1991 | Wiltz, Jr. et al. | 521/174 |
| 5,237,036 | 8/1993 | Spitzer | 528/76 |

FOREIGN PATENT DOCUMENTS 1133650  5/1981  Canada.

OTHER PUBLICATIONS

"Polyurethane Elastomers", C. Hepburn, Applied Science Publishers, Ltd., 1982.
"Polyurethane Polyols", Dow Chemical Company, VoranolCP 5021 Polyol, No Date,
"Urethane Polyols", Down Chemical Company, Voranol CP 1421 Polyol. No. Date.

Primary Examiner—James J. Seidleck
Assistant Examiner—Rabon Sergent
Attorney, Agent, or Firm—John R. Kirk, Jr.; Jenkins & Gilchrist

[57]  ABSTRACT

A new polyetherpolyurethane system for the formation of end caps for oil filters is disclosed using a blended oxyalkylene polyol having a functionality greater than 2 and the absence of any oxyethylene component. The blend having a functionality greater than 2 is mixed with a diol cross linker prior to reacting with an isocyanate.

9 Claims, No Drawings

POLYETHERPOLYURETHANE END CAPS FOR OIL FILTERS

TECHNICAL FIELD

This invention relates generally to an improved oil filter end cap made of polyetherpolyurethanes.

BACKGROUND ART

For years the public has been bombarded with the statement "Pay me now, or pay me later", and the vision of a well-fed auto mechanic leaning over a suffering automobile engine smiling benignly into the camera holding an oil filter. These filters are well-known and the cartridge inside is held together in its oil-filtering relationship by end caps, which allow entry of the oil to the interior of the filter to be forced through the filtering medium to remove harmful grit and dirt for return to the operating internal combustion engine. Alternative materials for the preparation of all parts of an oil filter have been a continuing quest in the search of excellence in performance and for a reduction in cost. This invention relates to the molded end caps and the preparation of such with a special polyetherpolyurethane material.

Several uses of a specific thermoset polyetherpolyurethane system is described in U.S. Pat. No. 5,001,167 where many other attempts to use polyurethanes in the presence of hydrocarbon fuels, hydrocarbon lubricants, freezing point depressant fluids (antifreeze), and water are described. This patent also describes prior art attempts to prepare solvent resistant polyetherpolyurethane products and offers its solution, specifically mentioning an operation relating to oil filters and the end caps for such filters. The solution proposed related to the well-know polyether polyol component for the preparation of a thermoset polyurethane elastomer. The polyether polyol proposed in the prior art U.S. Pat. No. 5,001,167 contains at least 50 wt % oxyethylene groups, based on the total active hydrogen component, but which does not involve the well-known concept of using "ethyleneoxide capped" polyols. Said another way, the polyether polyol contains considerable oxyethylene units but the reactive terminal groups are all secondary hydroxyl groups produced by the reaction of an epoxide containing three or more carbon atoms. As taught by U.S. Pat. No. 5,001,167, polyurethanes prepared from polyether polyols are more resistant to hydrolysis in the presence of water than are polyester polyols frequently used in the production of polyurethane products.

However, the polyether polyol reaction material taught by U.S. Pat. No. 5,001,167 has its drawbacks since the oxyethylene units are more susceptible to the absorption of water, which if present during the urethane forming reaction, reacts with isocyanate groups to produce carbon dioxide which causes foaming. Foam forming reactions cause a deterioration in the physical properties of solid polyurethane products, thus making them more likely to fail in a high temperature, high pressure environment in the presence of a combination of aggressive solvents.

Not only must an end cap for an oil filter have resistivity to a number of aggressive solvents in a hostile environment where temperature, pressures, and contaminants abound, they must have physical properties which do not lead to product failure over long periods of time of exposure to this hostile environment. The product must be hard, but it cannot be so hard that it becomes susceptible to cracking upon standing. It must have sufficient tensile strength over a wide range such that it can stand the internal pressures of the operating internal combustion engine. Even though polyether polyols themselves prepared only from epoxides having three or more carbon atoms are well known, this invention is the discovery that specific combinations of these polyether polyols, when reacted with the well-known methylene bridged aromatic polyisocyanates having a functionality greater than 2, an oil filter end cap having outstanding physical properties as well and resistance to solvents, regardless of whether hydrocarbon, water or glycols, results. Previously, polyurethane formulations used for this purpose suffered from the disadvantage of lacking one or more of the physical properties or as set forth above in connection with the discussion of this prior art patent. Further polyurethane thermoset polymer described in the prior art have shown a tendency to crack, particularly radial cracks which form upon allowing the part to sit on the shelf. Replacement oil filters must have a good shelf life without deterioration.

These disadvantages, as well as other inferior physical properties resulting from the use of the polyether polyols containing oxyethylene groups, are avoided by using a particular polyether polyol combination in the polyurethane elastomer forming the oil filter end cap of this invention.

DISCLOSURE OF THE INVENTION

In accordance with this invention, an improved oil filter end cap is prepared from a thermoset polyetherpolyurethane elastomer which involves the catalyzed reaction of a methylene bridged polyarylpolyisocyanate component with a particular polyether polyol component. This polyether polyol component results in the improved solvent resistant polyetherpolyurethane end cap for an oil filter of this invention and comprises a diol first component, having a molecular weight of from about 75 to about 200, and a higher functionality polyether polyol mixture second component of from about 15% to about 90% by weight of a polyether polyol having no oxyethylene groups, a functionality greater than 2 and a hydroxyl number of from about 30 to about 60; and from about 10% to about 85% by weight of a polyether polyol having no oxyethylene groups, a functionality greater than 2 and a hydroxyl number of from about 170 to about 110. This polyol component, which is reacted with the polyisocyanate, is a mixture of from about 10% to about 25% by weight of the diol first component, and correspondingly, from about 90% to about 75% by weight of the higher functionality blended polyether polyol second component. Preferably, from about 15% to about 20% by weight of the butanediol is present, with a corresponding 80% to 85% of the higher molecular weight materials. These percentages may be varied within the ranges stated in order to adjust the hardness, tensile strength and other physical properties of the polyetherpolyurethane end cap for the oil filter, depending upon the solvents encountered and the conditions under which the filter is to be used.

Having described the broad scope of the invention, the preferred embodiment would involve using a polyether polyol mixture second component having from about 30% to about 70% by weight of a polyether polyol having no oxyethylene groups, a functionality of about 3 and a hydroxyl number of from about 50 to about 60, and from about 70% to about 30% of a second polyether triol having no oxyethylene components and a hydroxyl number of from about 110 to about 120. This polyether polyol second component would be mixed with a preferred diol, 1,4-butanediol, such that the overall polyol component of the polyetherpolyurethane solid oil filter cap is formed upon reaction with the polyisocyanate.

The physical properties of the oil filter cap may be readily adjusted by altering the relative proportions, within the parameters above, of the high molecular weight hydroxyl number from 30 to 60, higher functionality material, and the lower molecular weight higher functionality material with the diol cross linker. For instance, if the lower molecular weight triol is increased, the hardness and rigidity of the polyurethane increases, but the elongation properties are lower. Hardness can be adjusted by raising and lowering the proportions of the cross linker, preferably butanediol, in the material. Since the polyurethane, in use, is blended and poured into a mold prior to affixing to the filter elements, the molding and demolding properties of the material should also be considered. An increase in the higher molecular weight portion of the second component would lower the hardness, as would a decrease in the lower molecular weight polyether polyol of the second component. If the butanediol or cross linker portion is increased, then the hardness can be restored.

The polyether polyols useful in the practice of this invention are prepared by reacting an alkylene oxide having three or more carbon atoms, preferably propylene oxide, with a polyhydric initiator. The polyether polyol takes on the functionality of the initiator, originally reacted with the alkylene oxide, preferably propylene oxide. The reaction, well known to those skilled in the art, continues until the desired molecular weight as demonstrated by the hydroxyl number is obtained. Suitable initiators catalyst and the alkoxylation reaction are well known and need not be specifically described herein.

It has been discovered that an especially preferred formulation would contain 50 parts by weight of a 3,000 molecular weight (hydroxyl number 56) triol; 33 parts by weight of a triol having a hydroxyl number of about 112, and about 17 parts by weight of butanediol results in a polyether polyurethane oil filter end cap which has an advantageous balance of hardness, elongation and rigidity, as well as the molding properties which allow it to be poured into a mold, caused to become to affixed to each end of the oil filter and then to cure in such configuration without any resulting cracks. As will be shown later, the physical properties of this especially preferred embodiment result in an excellent filter material.

The methylene bridged polyarylpolyisocyanate useful in the practice of the invention is well-known to the polyurethane art as described in U.S. Pat. Nos. 3,594,352 and 5,001,167, both of which are incorporated herein by reference for all purposes. The later patent describes the particular polyphenylmethane polyisocyanate component useful in the practice of this invention and demonstrates that it is well-known to use such component in the formation of elastomers.

The functionality of these polymeric isocyanates, as they have come to be known, is greater than 2.0 as stated above. Preferably, the average functionality would be in the range of about 2.2 to about 4. The preferred range of the functionality of the polyurethane would be from about 2.2 to about 3.3 with an especially preferred range from about 2.2 to about 2.5. The urethane-forming reaction is carried out at an isocyanate index (NCO/OH) of from about 0.9 to about 1.5, preferably about 1.0 to about 1.25, and most preferably at about 1.05.

Suitable catalysts of urethane formation useful in the practice of this invention are also well-known to those skilled in the art as described in the above-mentioned patents and are added in catalytic amounts. The catalyst system useful in this system include an organometallic catalyst such as, preferably dibutyltin dilaurate. Many organometallic catalysts are useful in the practice of this invention and are sold under the trademark DABCO™ by Air Products Corporation. Often, for convenience of handling and measuring small quantities, the organometallic catalyst is used in a solution of butanediol to make it more easily handled and, since the butanediol is reacted, it does not become a contaminant. The preferred catalyst mix is usually one part organometallic catalyst to nine parts of the butanediol. In production the dilution is no longer important where larger amounts are measured and used. Other popular catalysts for the polyurethane reaction are certain tertiary amine catalysts, such as, for example, triethylenediamine, sold by Rhein Chemie Corporation as RC-104. Other satisfactory amine catalyst are described in U.S. Pat. No. 5,001,167. The catalysts system would be a blend of the amine catalyst and the organometallic catalyst varying from a ratio of 4:1 (metallic to amine) to about 5:1 (amine to metallic). The total catalyst system would be present in an amount of from about 0.02 wt %, to about 1 wt. %, based upon the weight of the polyol component, preferably from about 0.05 to about 0.1, normally less than about 0.1%. The selection and adjustment of catalysts amount is well within the ordinary skill in the art, and does not, as such, form part of this invention other than its contribution to the best mode for practicing the invention.

In the practice of this invention to make the oil filter end pieces the specific polyol component as defined above is mixed and reacted with the well-known methylene bridged aromatic polyisocyanates, preferably polyphenylmethane polyisocyanate, having a functionality greater than 2, in the presence of a catalyst system which is well known and has long been used by those skilled in the art of preparing polyurethane elastomers. Another component which may be optionally added is a variety of fillers or pigments to vary the color and surface treatment of the end cap if desired. This is well within the skill of the practitioner, and the addition of such inert, unreactive materials to the part of the reaction mixture containing the polyether polyol is only incidental to the practice of the invention herein described and claimed.

In preparing the end caps to the filter elements themselves, the polyol components are mixed together at room temperature including the catalyst systems. End cap molds are typically heated to 250° F. The isocyanate and polyol components are mixed through an in-line static mixer and discharged into the end caps mold. The urethane forming mixture was allowed to react in the mold for about 60% to 80% of the gel time of the reaction mixture, from about 15 to about 18 seconds for a 25 second gel time, before insertion of one end of the filter media. This delay time would vary depending upon the gel time of the polyurethane reaction mixture used as an end cap. Insertion of the filter media into the ungelled reaction mixture allows the media, usually paper, to become bonded within its reaction structure of the polymer. The filter media and the polyurethane material in the mold was then oven-cured, usually at the temperature of 250° F. for about 2 minutes. Greater or less time, or different temperatures may be used, as desired. Of course in a commercial operation the drying and insertion of the filter media would all be an automated operation. After curing, the filters were removed from the oven and the mold, with the process being carried out again for the other end of the filters. Use of the formulations described above result, after curing and storage at room temperature, in uncracked polyetherpolyurethane material in oil filter end caps. To be successful, these end caps must not separate from the filter media upon aging and remained in good contact.

BEST MODE FOR CARRYING OUT THE INVENTION

Among the formulations set forth above, the best mode for carrying out the invention involves mixing the polyether polyol components as follows: 50 parts by weight of a propoxylated triol having a hydroxyl number of 56; 33 parts by weight of a propoxylated triol having a hydroxyl number of about 112 and 16.92 parts by weight of 1,4 butanediol with 0.06 parts by weight of triethylene diamine catalyst in a 10% solution of 1,4-butanediol and 0.02 parts by weight of dibutyltin dilaurate catalyst in a 10% solution of 1–4,butanediol. In a commercial operation the catalyst would probably be added without dilution. This polyol system is reacted with a polyphenylmethane isocyanate having a functionality of about 2.3 (PAPI 2094) in proportions sufficient to give an isocyanate index of 1.05 within the reaction mixture. This is the especially preferred isocyanate index in the practice of this invention. The reaction mixture is found to have a gel time of about 24 seconds.

The reacting material is discharged into a mold preheated at 250° F. After about 18 seconds, one end of filter media is plunged into the reacting mixture and placed in a 250° F. oven to cure for a period of two minutes. The process is repeated for the other end of the filter media to form a filter cartridge. Variations of this method would be apparent to those skilled in the art depending upon the degree of sophistication of the equipment available.

Also, for testing purposes, plaques approximately 6 inches by 6 inches by about 1/12th of an inch were prepared using the various polyurethane formulations. From these plaques, the test strips were prepared in the usual manner. The foregoing formulation was found to be particularly preferred after testing.

Because of the environment within which a filter is used in an internal combustion engine, after curing the samples are removed from the oven and allowed to age at room temperature for several days. A litmus test for materials used was cracking at room temperature. When this occurred, such polyurethane end caps materials were discarded as unacceptable.

Concurrently, testing was performed on test strips from the plaques in environments that were more severe than the environment in which the filter would normally be used: Mixtures of 90% engine oil with 10% water; 50% ethylene glycol and 50% water; 100% diesel fuel and 100% engine oil. Samples were immersed in the solvents, except for diesel fuel, at 250° F. with samples being pulled at 96 and 250 hours of exposure and examined. Samples were immersed in diesel fuel at 70° F.

The plaques were removed from the buckets containing the fluids and allowed to cool to room temperatures in freezer food storage bags. Standard tensile and test strength tests (ASTM) were performed on the dies cut from the plaques. Hardness was checked with Shore A or Shore D durameters. The aging before testing was a minimum of one week. Tensile strength and tear strength samples were tested at a cross-head speed of 20 inches per minute.

The foregoing best mode description and the invention itself will be further highlighted and exemplified by the following examples which also includes a comparative example showing the importance of the use of a polyetherpolyol component which has no oxyethylene groups in its structure. These examples are provided for purposes of illustration and are not to be considered as limiting the instant invention.

EXAMPLE

Polyetherpolyurethane oil filter end caps and test plaques were prepared using the procedure as described above. The formulations and properties are set forth below.

|  | 1 (Prior Art) | 2 (Prior Art) | 3 (C-4) | 4 (D-2) | 5 (B-2) |
|---|---|---|---|---|---|
| Parts by weight | | | | | |
| Isocyanate Component: | | | | | |
| NCO-A | 100 | | 68.44 | 66.87 | 49.16 |
| NCO-B | | 100 | | | |
| Polyol Component: | | | | | |
| OH-A | 173 | 134 | | | |
| OH-B | | | 50 | 50 | |
| OH-C | | | 33 | 33 | 88 |
| Butanediol | | | 16.85 | 16.92 | 11.8 |
| Catalyst: | | | | | |
| Triethylenediamine (RC/104) | | | 0.075 | 0.06 | 0.1 |
| Dibutyltin dilaurate (RC/201) | | | 0.075 | 0.02 | 0.1 |
| NCO Index | 1.05 | 1.05 | 1.05 | 1.05 | 1.05 |

GLOSSARY

| | Generic Description | Trademark | Supplier |
|---|---|---|---|
| NCO-A | A polymeric diisocyanate having a molecular weight of about 300.f = 2.3 | PAPI 2094 | DOW |
| NCO-B | A blend of NCO-A (25%) and a second commercial isocyanate (75%) | PAPI/Isonate 2181 | DOW |
| OH-A | A 5000 MW triol containing 75% EO groups and 25% PO groups. Received as a blended B-component including catalyst. | VORANOL CP-1421 | DOW |
| OH-B | A polyether triol containing 100% PO groups having an OH # of 57.4 (3000 MW) | VORANOL 230-056 | DOW |
| OH-C | A polyether triol containing 100% PO groups having an OH # of 111.5 (1500 MW) | VORANOL 230-112 | DOW |
| RC/104 | Triethylenediamine | RC/104 | Rhein |
| RC/201 | Dibutyltin dilaurate | RC/201 | Rhein |

The polyurethane end caps and polyurethane material thus prepared was tested as described above with results as follows.

| TEST RESULTS | | | | | |
|---|---|---|---|---|---|
| Example | 1 | 2 | 3 | 4 | 5 |
| Unaged | | | | | |
| Tensile Strength - Unaged | 1104 | 2142 | 2546 | 2295 | 1173 |
| Tear Strength - Unaged | 121 | 286 | 207 | 175 | 114 |
| Hardness - Unaged | 80A | 82A | 88A | 93A | 85A |

TEST RESULTS -continued

| Example | 1 | 2 | 3 | 4 | 5 |
|---|---|---|---|---|---|
| Engine Oil/Water Immersion at 250° F. for 250 hours | | | | | |
| Tensile Strength | 884 | 808 | 1262 | 909 | 411 |
| Tear Strength | 164 | 222 | 123 | 100 | 78 |
| Hardness | — | 40A | 76A | 70A | 64A |
| Ethylene Glycol/Water Immersion at 250° F. for 250 hours | | | | | |
| Tensile Strength | 0 | 0 | 855 | 956 | 436 |
| Tear Strength | 0 | 0 | 99 | 114 | 83 |
| Hardness | — | 40A | 67A | 70A | 64A |
| Diesel Fuel Immersion at 70° F. for 250 hours | | | | | |
| Tensile Strength | 1164 | 1820 | 2362 | 1931 | 609 |
| Tear Strength | 106 | 313 | 154 | 159 | 70 |
| Hardness | | 74A | 85A | 90A | 85A | 78A |

Tensile Strength is in pounds per square inch (PSI)
Tear Strength is in pounds per lineal inch (PLI)
Hardness uses the Shore scale (Shore A or Shore D)

As subjective observations of the testing of the above identified polyurethane materials, the material of Example 1 became brittle and cracked in the presence of the ethylene glycol/water mixture and the oil and water solution severely degraded the material. Example 2, again a prior art polyurethane material also showed imbrittlement and cracking under the glycol/water test. While it molded well and did not shelf crack, the material as a filter end cap or filter media formed radial cracks in the oil/water solution.

The polyurethanes of Examples 3 and 4 represent formulations within the scope of this invention. Both of these materials showed good properties and strength even though the material of Example 3 showed some instability in the presence of oil and water as shown by the data. The material of Example 4 shows that highly reduced catalyst levels are possible.

As further comparison of the polyurethane filter end caps of this invention with those wherein the polyol component contains oxyethylene groups, a longevity test was run using the material prepared in Example 2 and the material prepared in Example 4 molded as end caps or filters. As described above, the various materials were heated to 250° F. and polyurethane end caps on oil filters were immersed in them and periodically examined and tested. The materials of Example 2 failed well prior to completion of the test and other than for testing in glycol and water, the material of Example 4, within the scope of this invention, all resulted in the test being terminated at least after the material had been held in the test bucket at the elevated temperature for at least 1000 hours. In each instance, the shore hardness was tested and comparison of the results are shown on the following table entitled Longevity Tests.

LONGEVITY TESTS

| TEST | Ex. 2 Inline Mix | | Ex. 4 Inline Mix | | Ex. 4 Hand Mixed | |
|---|---|---|---|---|---|---|
| | Hrs. | Hardness | Hrs. | Hardness | Hrs. | Hardness |
| Unaged | | 85–86 | | 90–93 | | 90–92 |
| Engine Oil | 640 | 76–80 | 1000 | 88–90 | 1000 | 88–92 |
| Engine Oil/Water | 500 | 72–80 | 1000 | 75–82 | 1000 | 82–85 |
| Hydraulic Oil | 640 | 78–80 | 1000 | 82–86 | 1000 | 85–88 |
| Hydraulic Oil/Water | 600 | 66–70 | 1000 | 85–88 | 1000 | 88–90 |
| Glycol/Water | 250 | 55–62 | 650 | 75 | 1000 | 60 |
| Transmission Fluid | 640 | 75–80 | 1000 | 90 | 1000 | 88–92 |
| Diesel Fuel (RT) | 850 | 78–80 | | | 1200 | 88–92 |
| Diesel Fuel (150° F.) | 475 | 77–79 | | | | |
| METHOD SHORE | | A | | A | | A |

As can be seen from the foregoing, the polyurethane end caps of this invention provide a substantial improvement over the prior art attempts, there being substantial improvement in properties when the polyol composition of the claims of this application are used.

Example 6

Polyurethane end caps and plaques for testing were made as described above using the formulation of Example 4, pigmented by addition of 2 parts per hundred of carbon black mixed into the polyol component. The molded black end caps were subjected to longevity testing for about 1100 hours as described above with no deterioration being observed. After cooling hardness was tested the results were as follows:

| Engine Oil/Water | 250° F. | 82–87A |
|---|---|---|
| Hydraulic Oil/Water | 250° F. | 91–92A |
| Hydraulic Oil | 250° F. | 86–90A |
| Transmission Fluid | 250° F. | 88–92A |
| Engine Oil | 250° F. | 85–86A |
| Diesel Fuel | 150° F. | 88–90A |

Unaged dies were prepared from the pigmented plaques and tested as follows:

| Tensile Strength, psi | 2401 |
|---|---|
| Tear Strength, pli | 192 |
| Hardness, Shore A | 92 |

Those of ordinary skill in the art upon reading the foregoing description of this invention and viewing the data provided in the examples will be able to make many modifications and obvious variations while remaining within the scope of the claims of this invention without departing therefrom. Such variations are intended to be covered by the claims of this invention.

What is claimed is:

1. An improved solvent-resistant thermoset polyether-polyurethane end cap for an oil filter formed by the catalytic urethane-forming reaction between a methylene bridged polyarylpolyisocyanate component and a polyether polyol component, the improvement which comprises:

the polyol component of the urethane-forming reaction comprising a diol first component having a molecular weight of from about 75 to about 200 and a polyether polyol mixture second component of from about 15% to about 90% by weight of a polyether polyol having no oxyethylene groups, a functionality greater than 2 and a hydroxyl number of from about 30 to about 60; and from about 10% to about 85% by weight of a polyether polyol having no oxyethylene groups, a functionality greater than 2 and a hydroxyl number of from about 170 to about 110;

wherein the polyol component includes from about 10% to about 25% by weight of the diol and, correspondingly, from about 90% to about 75% by weight of the polyether polyol mixture second component.

2. The polyetherpolyurethane end cap of claim 1, wherein the functionality of each of the polyether polyols of the second component is 3.

3. The polyetherpolyurethane end cap of claim 2 wherein the diol is 1,4-butanediol.

4. The polyetherpolyurethane end cap of claim 3 wherein the polyether triol second component is from about 30% to about 70% by weight of a polyether triol having a hydroxyl number of from about 50 to about 60 and, correspondingly, from about 70% to about 30% by weight of a polyether triol having a hydroxyl number of from about 110 and about 120.

5. The polyetherpolyurethane end cap of claim 4 wherein the polyether polyol component of the urethane forming reaction comprises from about 15% to about 20% butanediol.

6. A thermoset polyetherpolyurethane elastomer for molding end caps for oil filters comprising the catalytic reaction product of:

a polyphenylmethanepolyisocyanate component having an average functionality of from about 2.2 to about 2.5; and a polyether polyol component mixture having no oxyethylene groups which comprises:
(i) from about 30% to about 70% by weight of a polyether triol having a hydroxyl number of from 50 to 60; and
(ii) from about 70% to about 30% by weight of a polyether triol having a hydroxyl number of from 110 to 120;

and butanediol wherein the mixture is from about 15% to about 20% by weight butanediol and, correspondingly about 85% to about 80% by weight of the triol mixture in amounts to provide an isocyanate index of from about 1.0 to about 1.25.

7. The polyetherpolyurethane elastomer of claim 6 which includes a pigment in the polyether polyol component.

8. The polyetherpolyurethane elastomer of claim 6 wherein the catalyst is a mixture of dibutyltin dilaurate and triethylenediamine.

9. The polyetherpolyurethane elastomer of claim 8 wherein the catalyst is present in the polyether polyol component in amounts of from about 0.02% to about 1% by weight, based upon the weight of the polyol component.

* * * * *